United States Patent [19]

Toikka et al.

[11] Patent Number: 4,838,570
[45] Date of Patent: Jun. 13, 1989

[54] METHOD, CONTROL SYSTEM AND EQUIPMENT TO PREVENT THE THEFT OF AN ARTICULATED VEHICLE AND/OR A TRAILER TO BE CONNECTED WITH A DRAWING VEHICLE

[76] Inventors: Ensio A. Toikka, Lukkarinkatu 9 C33, SF-21100 Naantali; Arto E. Toikka, Otakaari 20 B 41, SF-02150 Espoo, both of Finland

[21] Appl. No.: 88,111
[22] PCT Filed: Oct. 17, 1986
[86] PCT No.: PCT/FI86/00118
§ 371 Date: Aug. 31, 1987
§ 102(e) Date: Aug. 31, 1987
[87] PCT Pub. No.: WO87/02947
PCT Pub. Date: May 21, 1987

[30] Foreign Application Priority Data

Nov. 12, 1985 [FI] Finland .................................. 854440

[51] Int. Cl.$^4$ ..................... B60D 1/00; B62D 53/08
[52] U.S. Cl. .................................. 280/507; 70/238; 180/287; 280/433; 340/426; 307/10.2
[58] Field of Search ................ 180/287; 280/432, 433, 280/445, 507; 70/237, 238, 252, 255; 340/64, 63

[56] References Cited

U.S. PATENT DOCUMENTS

| | | | |
|---|---|---|---|
| 3,204,977 | 9/1965 | Eisenhauer et al. | 280/445 X |
| 3,254,904 | 6/1966 | Jewell | 280/433 |
| 3,922,897 | 12/1975 | Mickelson | 70/34 |
| 3,973,805 | 8/1976 | Stevenson et al. | 180/287 |
| 4,436,176 | 3/1984 | Cota | 340/64 |
| 4,570,966 | 2/1986 | Giboney et al. | 280/433 |
| 4,573,699 | 3/1986 | Smith | 280/432 |
| 4,614,357 | 9/1986 | Murray | 280/507 |

FOREIGN PATENT DOCUMENTS

| | | |
|---|---|---|
| 1630703 | 4/1971 | Fed. Rep. of Germany . |
| 3014521 | 10/1981 | Fed. Rep. of Germany . |
| 3102991 | 12/1981 | Fed. Rep. of Germany . |
| 3045345 | 7/1982 | Fed. Rep. of Germany . |
| 2049587 | 12/1980 | United Kingdom . |

*Primary Examiner*—John A. Pekar
*Attorney, Agent, or Firm*—Webb, Burden, Ziesenheim & Webb

[57] ABSTRACT

Theft prevention of trailers and articulated vehicles and a method, control system and equipment to prevent the seizure of a vehicle combination and/or a trailer to be connected with a drawing or tractor vehicle. According to the invention based on the data transfer between the first control unit (23) in the drawing vehicle and the second control unit (10, 10') in the trailer, the trailer and/or the vehicle combination formed by the trailer and the drawing vehicle is locked in such a way, that it becomes unfit for driving or towing, whereby when an attempt of seizure is directed to a vehicle combination at least one of the following actions is performed: the turning shaft (5, 5') or turning bogie (6, 6') of the trailer is locked as unturnable; the trailer, particularly a half-trailer, is bolted to the drawing table as unturnable in regard to the drawing table; and whereby when an attempt of seizure is directed to a trailer left by itself also moving of the pull pin (16) of the trailer is selectively prevented to the drawing position, in which coupling of the pull pin (16) to the drawing table and towing of the trailer by the pull pin (16) are possible.

15 Claims, 2 Drawing Sheets

METHOD, CONTROL SYSTEM AND EQUIPMENT TO PREVENT THE THEFT OF AN ARTICULATED VEHICLE AND/OR A TRAILER TO BE CONNECTED WITH A DRAWING VEHICLE

BACKGROUND OF THE INVENTION

The invention relates to a method, control system and equipment for preventing the theft of an articulated vehicle and/or a tractor trailer unit.

A drawing vehicle or tractor is traditionally actuated by an ignition lock operated by an ignition key or by a separate start button. Thereafter the hand brake is released from its operable position and driving can be commenced.

One disadvantage connected with the conventional prior art trailers is that anybody can drive or tow a trailer illegally with a properly equipped tractor vehicle. In addition, a tractor-trailer can be seized from the driver by force. Also a vehicle alone or a tractor trailer combination in a parked state can be stolen by so called "hot wiring", i.e., by-passing the ignition lock and starting the motor either from the dashboard or under the hood.

Because the theft rate of vehicles and particularly articulated vehicles has increased, several solutions have been proposed to hamper or prevent such thefts.

Finnish Patent No. 850,958 discloses a device to prevent the theft of a vehicle and a trailer connected with it which includes a brake system operated by pressure medium. The device according to the invention is connected to the before-mentioned break system, and comprises a three-way valve controlled by one code lock and includes one inlet opening and two outlets. The inlet opening to each outlet is controlled by the code lock and thus the pressurization of the break system or vice versa is made possible.

In U.S. Pat. No. 4,436,176 a system to prevent the theft of an articulated vehicle is suggested. Couplings are placed in different parts of the vehicle combination and these couplings must be engaged in a certain order and set to a certain position in order to start the vehicle. The disclosed system functions when connected with the starting circuit of the vehicle.

In British Pat. No. 2,141,567 a device to prevent seizure of a vehicle is also disclosed. The device consists of a code feeding section, a memory section in which a reference code has been deposited in advance, and a comparison section, in which the reference code is compared with the feeding code. The device is coupled to a signal horn and starting system of the vehicle, so that the device, when it is activated by a certain code preventing the seizure, switches off the vehicle motor by the timer section in it after a predetermined time and actuates an alarm signal. If the danger factor is passed, the driver can stop the timer by feeding a certain signal in code form to the device.

German Pat. No. 3,045,345 shows a theft-preventing device influencing the fuel feed or the ignition circuit of the vehicle motor. The device functions by code control, so that a signal in a series of numbers has been predeposited in it and compared with the digital signal to be fed to the device. If the fed signal does not correspond with the deposited signal, the device breaks off the ignition circuit (gasoline motors) or fuel feed (diesel motors) of the vehicle.

Also known is a method used in an anti-theft device sold under the trademark "PSI MKII" by sales agent Pekka Sarssi International Oy Mikonkatu 21 A 00180 Helsinki, Finland. This device is controlled by infra-red beams using a small infra-red transmitter. A disadvantage in the system is its dependence on the driver. Moreover, the infra-red transmitter and the key can be stolen.

In summary the essential disadvantages of previously known anti-theft methods and devices such as code locks, hand break gear locks, alarm arrangements, interlock systems of the steering wheel and pull pin locks are as follows:

the tractor vehicle alone or the tractor trailer combination can be seized after the motor is properly started, it is relatively easy to defeat the anti-theft devices, by previously known methods it is not possible with sufficient security to prevent illegal towing or driving of a vehicle combination nor the seizure of a parked tractor or a trailer left by itself.

Connected with the above-mentioned, one must still particularly emphasize, that trailers left by themselves are usually entirely devoid of any seizure-preventing devices and thus quite suitable objects for capture.

The first goal of the present invention is to achieve a solution based on a completely novel way of thinking to prevent the seizure of vehicles and trailers. The rapid breaking or evading of such solution is not possible and by which the thefts of both a trailer left by itself and a tractor trailer combination are reliably prevented. The second goal of the invention is to eliminate the disadvantages and weaknesses in the previously known methods and devices for prevention of seizures and to thus prevent thefts of trailers and articulated vehicles during both driving and parking.

These goals have been achieved by the method, control system and equipment according to the invention, the characteristic features of which have been described in the appended claims.

SUMMARY OF THE INVENTION

The method according to the invention comprises the step of making the trailer and/or the vehicle combination formed by the trailer and the drawing tractor vehicle unfit for driving, by locking the turning trailer shaft or bogie to render it as unturnable, or by locking the trailer, especially half-trailer, as unturnable in regard to the drawing table, the driving or towing of a vehicle combination or a trailer is thus rendered impossible.

The control system according to the invention is based on the principle, that by making a trailer or a drawing tractor vehicle and a trailer an operable combination only after an acceptable code comparison is made. When error codes emerge, the units are locked and rendered unturnable in at least one area necessary for driving the vehicle combination or towing the trailer, such as the turning shaft or bogie of the drawing vehicle or the vehicle combination, the turning joint formed by the pull pin and the drawing table, the turning pull pin moved in a position, in which its connection to the drawing table is prevented.

By using two separate control units dependently coded to drive different operational elements in the vehicle or the vehicle combination, it is possible to influence the functions necessary for the driving of the vehicle. Thus, incidents of theft can be either prevented or significantly delayed.

In a preferred embodiment of the control system, the control commands from the control units are entered by a keyboard, so that correct codes make it possible for a relay unit in the drawing tractor vehicle and/or the trailer to open and close the operational elements of the equipment such as solenoids, magnetic valves and transmission gears, which then enable to normal use of the drawing tractor vehicle, trailer and the tractor-trailer combination. In the contrary condition, the system prevents the illegal use of the trailer, in which case the pull pin of the trailer does not functionally turn to the towing position, or the vehicle combination and/or trailer is locked as unturnable. Moreover, it is as contemplated that the entry of incorrect codes activates alarms.

As a summary, it can be stated that a solution has been achieved, by which a trailer or a vehicle combination can be made as a drivable transportation unit only by using correct preset codes and by which driving and/or towing is made impossible, if a code or codes deviating from the present code or codes are fed to the control system. Thanks to the two-sectioned control system according to the invention, the driver can now, if needed, feed to the system transportation codes of other drawing vehicles or carriers, so that also these can draw a trailer provided with the equipment in compliance with the invention. The trailer can thus be towed only by predetermined tractor vehicles. The theft prevention equipment placed on the trailer can in a simple way be provided also with a key switch making it possible for freight companies to transfer the trailer to a ship and away from it. Instead of the key switch of course also a code feeding keyboard placed on the trailer can be used. Further on, it is advantageous, that a special theft code can easily be entered in the control system, which code is used if a theft takes place during the transport. The transport code makes normal driving operations possible for a certain time, after which the control system actuates independent theft prevention and alarm functions.

BRIEF DESCRIPTION OF THE DRAWINGS

The invention will be described in detail with reference to the accompanying drawings, in which.

DETAILED DESCRIPTION OF THE INVENTION

Figure 1:
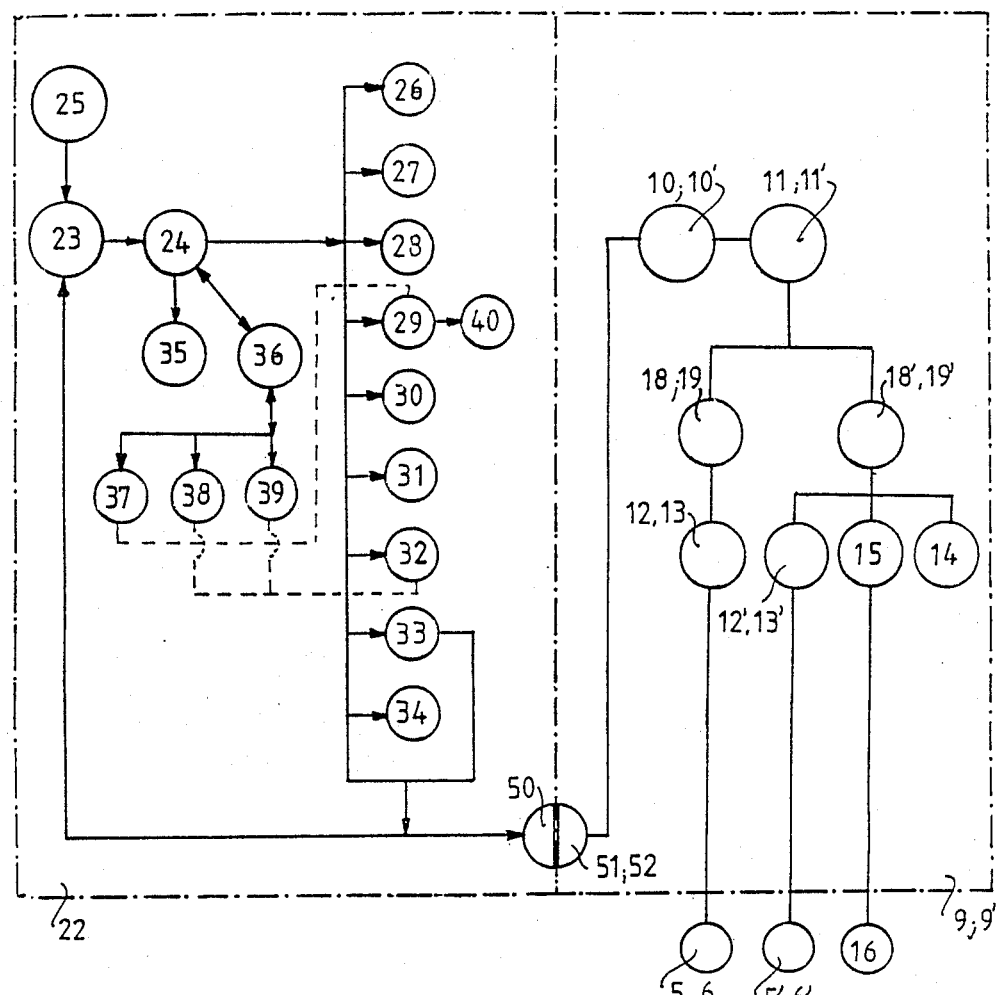
FIG. 1 shows schematically a control system according to the invention and the progress of the code information in it.

The part 22 of the control system of the seizure prevention equipment according to the invention which is placed on the tractor vehicle, comprises:
control unit 23,
relay unit 24 steered by the control unit 23,
code feeding keyboard 25 connected to the control unit 23,
alarm unit 36, and also preferably,
switches 37, 38, 39, which by unauthorized coupling activate the alarm and, when desired, actuate the functions to stop the vehicle either immediately, or after a predetermined time delay, and lock the vehicles influencing e.g. the brake, fuel, electric or pressure system. It is preferred that the switch 37 is connected to a hand brake system 29 and switches 38 and 39 which for instance are activated by the locks 32 of the tractor cab door.

As also shown in FIG. 1 the part 22 of the control system in the tractor vehicle further includes operational elements controlled by the control unit 23 and relay unit 24, preferably magnetic valves connected to a pressure system 27, brake system 28, hand brake system 29, fuel system 30, compressed air system 33 of the trailer, hydraulic system 34 and locking arrangement 35, by which an illegal access to the motor space of the vehicle can be prevented. The function of the electric system 31 and the solenoid 26 of the start motor as well as the locks 32 of the cab doors can also be influenced through the relay unit 24 of the part 22. The half-spherical symbol depicted in FIG. 1 and identified by the reference number 50 indicates the connection to the trailer. Part 22 of the control system placed in the tractor vehicle is preferably placed in an inaccessible location such as in the motor space of the vehicle, where it additionally is protected against break-ins by steel plates.

The other half of the control system of the invention consists of the part 9, 9' placed on the trailer which includes:
control unit 10, 10'
relay unit 11, 11' steered by the control unit 10, 10' and
power device 18, 19, 18', 19' steered by the control unit 10, 10' and the relay unit 11, 11' and locked by a bolt mechanism 12 on turnable shaft 5 of bogie 6 of the trailer. If more than one turnable shaft or bogie is desired to be locked as turnable by the control system, the control system placed to the trailer will be equipped with a corresponding number of additional power devices 18', 19', which drive the corresponding mechanisms 12', 13' in order to lock the desired number of turnable shafts 5' or bogies 6' as unturnable, most advantageously to a slanting position, so that the trailer becomes stiff and unturnable in regard to the tractor vehicle, which effectively prevents driving of the tractor-trailer combination and also more generally transporting the trailer around a curved road portion.

The part 9, 9' of the control system placed on the trailer can also be provided with the bolt mechanism 14 driven by the power device 18', 19', so that this bolt mechanism is set by the power device 19' to a position, in which it locks the half-trailer to the turntable in such a way, that turning of the half-trailer in regard to the turntable is prevented. Then the trailer becomes stiff and unturnable in regard to the tractor vehicle. Moreover this part 9, 9' of the control system can be equipped with a lifting or turning mechanism 15 of the pull pin 16 driven by the power device 19', so that the pull pin can be set to a locked position such that the trailer cannot be drawn out of it.

The above-mentioned part 9, 9' of the control system can advantageously be mounted together with other elements possibly connected with it, such as the power device 18, 19, 18', 19', bolt mechanism 12, 14 and lifting or turning mechanism 15 of the pull pin 16, to a place shielded against break-ins, for example, by steel plates. The half-spherical symbol identified in the figure by the reference numbers 51, 52 indicates the connection of the trailer to the tractor vehicle.

In the control system according to FIG. 1 on the basis of the code-form information sent by the control unit 23 provided with the keyboard 25 functioning as the feeding means of information, when the reference information in code form has previously been deposited to the control unit 23, it is possible to control the desired number of electrical, hydraulic, pneumatic and/or mechanical operational elements 18, 19, 18', 19' in the trailer and/or the vehicle combination, so that such an element influences at least one function, which as prevented makes it impossible either immediately or after a predetermined period to drive the vehicle combination and/or the trailer.

According to the invention the first feeding information in code form, preferably a series of numbers, is entered into the control unit 23 by the keyboard 25. Then this first feeding information is compared in the comparison section of the control unit 23 with the reference information pre-deposited in the memory section of the control unit 23. In the comparison section of the control unit 23 a signal is formed by the feeding information and the reference information, and this signal is fed along a first data transfer channel from the control unit 23 to the relay unit 24. Similarly a second code-form information is formed in this comparison section and it is fed along a second two-directional data transfer channel between the control unit 23 of the tractor vehicle to the control unit 10, 10' of the trailer including the second memory section, into which the second reference information has been deposited. In the comparison section of the trailer control unit 10, 10' the previously mentioned second reference information and the second code-form information from the control unit 23 are compared with each other. Then an impulse signal is formed, which is fed through at least one (third) data transfer channel to the relay unit 11, 11' to control the desired electrical, hydraulic, pneumatic and/or mechanical operational device 18, 19, 18', 19'. This impulse signal is either a preventing or a releasing signal of the desired function depending on the correspondence of the mentioned second reference information and the second code-form information.

It is known, that theft attempts of vehicles are remarkably stopped by a vehicle horn alarm signal system which is activated when the theft is attempted. Therefore, it is preferred that an additional data transfer channel leads from the trailer control unit 10, 10' to a horn signal system, so that when a preventing signal is generated, the circuit of the horn signal system is closed and the alarm actuated.

Though from the operational point of view of the invention it is not necessary, the effectivity of the seizure prevention can be increased by using the second code-form signal through the relay unit 24 as a seizure-preventing signal, when the first code-form feeding information fed to the control unit 23 differs from the preselected reference information to activate the pressure system 27, brake system 28, hand brake system 29, fuel system 30, compressed air system of the trailer 33, hydraulic system 34 or locking arrangement of the motor space 35. In addition, the second code-form information can be used as a seizure-preventing signal to influence the function of the electric system 31 and the start motor solenoid 26 as well as the tractor cab door locks 32.

It is also reasonable to emphasize that thefts are not directed only to parked tractor trailer combinations or trailers left by themselves, but that quite often situations occur where a tractor trailer combination is subjected to capture by force during transit. To guard against such situations, a second reference information, a so-called protection information, has been deposited in the memory section of the control unit 23 of the control system, so that instead of the first code-form feeding information, i.e. transportation code, a protective code corresponding to the protection information deposited in the memory section of the first control unit 23, as mentioned above, can be fed to the control unit 23. Then a temporary release signal of the desired function making the driving of the vehicle combination possible is at first generated in the control unit and then, after a certain delay time, during which the driving of the tractor trailer combination is possible in a normal way, first a signal activating the stopping function of the vehicle, preferably breaking of the fuel feed or braking, and thereafter a signal preventing the desired function and activating the power device 18, 19, 18', 19', so that it thus prevents at least one function necessary for the driving of the vehicle combination or generally the drawing of the trailer and advantageously activates also the alarm. In this connection one must emphasize, that from the operational point of view of the invention the use of the function stopping the vehicle is not necessary. This arrangement is, however, preferred because the vehicle combination might get damaged, if it should be stiffened as unturnable suddenly under driving conditions.

As already stated above, as a function by which it is possible to effectively prevent the driving of the tractor trailer combination or more generally the pulling of the trailer, it is preferred to select at least one of the following:

the trailer and the tractor vehicle are stiffened as unturnable in regard to each other, whereby an adverse element of the bolt mechanism 14 to be moved by the power device 19 is pushed to a guiding groove of the pull pin in the drawing table or adverse elements of the bolt mechanism are pushed to both sides of the drawing table so that the extended adverse element is supported in the drawing table and prevents, together with the pull pin 16, turning of the trailer relative to the drawing table;

at least one turnable shaft of the trailer is locked as unturnable, advantageously to a slanting position, so that a first annular ball ring of the suspension bearing of the shaft or the bogie stationary fixed to the chassis of the trailer and a second annular ball stationary fixed to the shaft 5, 5' or bogies 6, 6', which rings as rotatingly mounted in bearings in regard to each other during the normal drive thus make possible turning of the shaft 5, 5' or bogies 6, 6', are locked by a proper adverse element of the bolt mechanism 12 driven by the power device 18, 18', 19' as immobile in regard to each other;

turning pull pin 16 in the trailer, fixed to the rotating shaft 15 driven by the power device 19 is locked to the position, preferably slantingly in regard to the guiding groove of the drawing table, so that both the coupling of the pull pin 16 to the drawing table and drawing of the trailer from the pull pin 16 are prevented.

The control unit 23 which is placed in the tractor vehicle and directs the function of the relay unit 24, which includes a feeding device 25 for code-form information and necessary memory and comparison sections, preferably comprises a micro computer sold under the trademark "ART-100E", for example. A control unit 10 or 10' placed in the trailer and which directs the function of the relay unit 11, 11', and includes a feeding device for code-form information and necessary memory and comparison sections, preferably comprises a micro computer sold under the trademark "ART-220E", for example. These devices, as well as cables needed in the control system and data transfer channels, are commercially available from ARTSOFT having a registered office in Helsinki, Finland.

Figure 2:
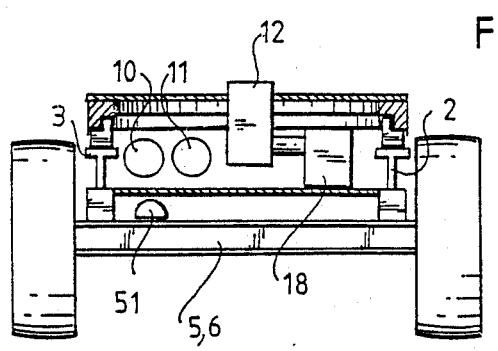
FIG. 2 is a simplified view of the equipment according to the invention, by which the turning trailer shaft can be locked as immobile.
Figure 3:
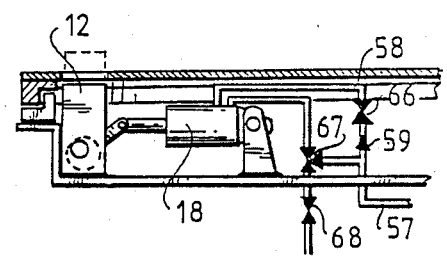
FIG. 3 is a more detailed view of the locking mechanism of the equipment of FIG. 4 showing the necessary piping and valves.

FIGS. 2 and 3 depict equipment to be driven by the control system according to the invention, the so-called security locking equipment. With this equipment some of the turning shafts 5 or bogies 6 of the trailer, i.e., whole trailer, or turnable shafts 5' or bogies 6' of the half-trailer can be locked as immobile, most advantageously to a slanting position in regard to the other shafts or bogies of the vehicle combination or the trailer.

The conventional turning shaft is mounted to the trailer by two annular ball rings rotating in regard to each other, whereby one ball ring is stationarily fixed either directly or, as shown in FIGS. 2 and 3, through spacers 2 and 3 to the shaft 5 or bogies 6 and the other ball ring to the chassis structures of the trailer. Due to spacers 2 and 3, a larger space is formed between the lower bottom of the trailer and the shaft or bogie. The equipment according to the invention and the part of the control system on the side of the trailer driving it are adapted to fit into this space. Moreover the said space is protected against break-ins by steel plates placed over and under the said space. As shown in FIG. 2, the power device 18 belonging to the equipment according to the invention is fixed to the steel plate shielding the said space underneath, so that the bolt mechanism 12 driven by the power device penetrates, when the preventive signal is generated, through the opening in the steel plate shielding the said space from above thus locking the ball rings as immobile in regard to each other. In FIG. 2 the electrical connection to the tractor vehicle is shown by a half-spherical symbol and identified by the reference number 51.

FIG. 3 shows further details of the power device 18, bolt mechanism 12 and instruments to achieve the desired locking function of the equipment shown in FIG. 2. In the exemplary case of FIG. 3 the power device comprises a pneumatic cylinder 18 fastened at its one shaft end to a lug, which is fixed, for example, by welding to the steel plate protecting the before-mentioned space underneath. The pneumatic cylinder receives a charging pressure from a delivery pipe 58 connected to a filling pipe 57 of a brake circuit of the trailer. The delivery pipe is provided with a return check valve 59 preventing the medium flow in an opposite direction, and with a valve 66 directed by the control system according to the invention and which can be, for example, a magnetic valve. Still referring to FIG. 3, a discharge pipe of the pneumatic cylinder and the valves 67 and 68 inserted in it are also shown. The valve 67 is pressure-operated and receives the control pressure from the filling pipe 57 of the brake circuit and permits the medium flow to discharge from the cylinder 18 when the pipe 58 is out of pressure. Valve 68 is electrically operated. The piston rod of the pneumatic cylinder 18 is connected through articulated levers and a cam to the bolt mechanism 12. The cam and the articulated levers translate the axial movement of the piston rod of the pneumatic cylinder 18 to an up-and-down movement at the free end of the bolt mechanism. During the upward movement of the bolt mechanism 12, the end thereof penetrates the steel plate protecting the above-mentioned space from above and proceeds through the opening close to the outer edge of the mentioned ball ring thus locking the shaft 5 or the bogie 6 as unturnable.

In this connection it is reasonable to emphasize that the use of the free end of the bolt mechanism 12 moving in the up-and-down direction to achieve the desired locking result is not necessarily the only possible form. Thus the piston rod of the power device can be provided for instance with suitable projections or serrations corresponding to the design of the inner surfaces of the annular ball rings.

Figure 4:
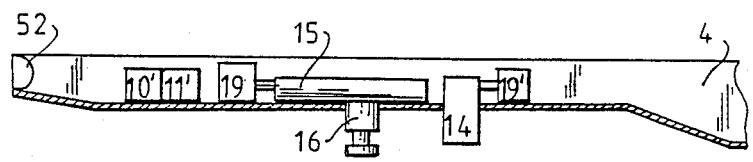
FIG. 4 is a simplified side view of the equipment according to the invention, by which on the one hand a half-trailer can be locked in regard to the drawing vehicle as unturnable, and on the other, the turning pull pin of the half-trailer can be set to the position where drawing of the trailer from it becomes impossible.
Figure 5:
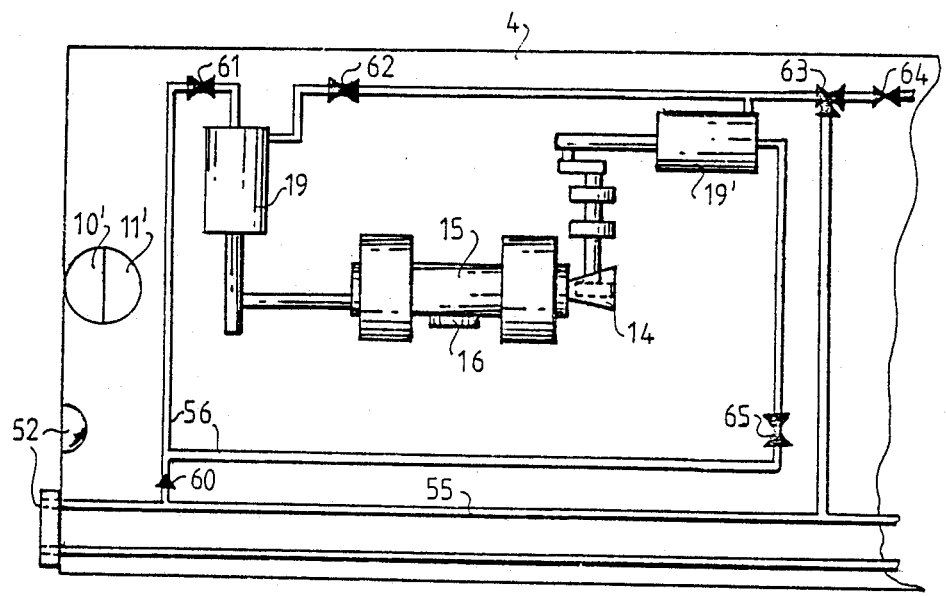
FIG. 5 is a plan view showing the equipment similar to the one of FIG. 4 detailing the necessary piping and valves for the operation of the equipment.

FIGS. 4 and 5 show another preferred embodiment of the invention for making a trailer and/or a tractor trailer combination unfit for driving or towing. In this embodiment the goal is achieved by locking a trailer, i.e., half-trailer, connected to a tractor vehicle as unturnable in regard to the drawing table and in case of a half-trailer left by itself by turning the pull pin 16 of the trailer to a slanting position in regard to the guiding groove in the drawing table.

FIG. 4 shows the theft-preventing equipment according to a preferred embodiment of the invention, i.e. security locking equipment of a half-trailer placed under the chassis structures of a half-trailer. The device disclosed within a casing 4 of steel plate and has a pull pin 16 stationarily fixed to a rotating shaft 15 driven by a reciprocating piston rod of the first power device 19 and thus turning with the rotating shaft 15. A bolt mechanism 14 is driven by a second power device 19' and by a crankshaft and a cam member connected with the reciprocating piston rod of the said power device. This bolt mechanism 14 selectively includes either one protruding end fitting to the guiding groove of the drawing table, as shown in FIG. 4, or at least two protruding ends fitting around the inner perimeter of the drawing table. In this manner, each of the bolt ends, preferably equipped with the aforementioned cam member, changes the rotating movement of the crankshaft to a vertical up-and-down movement at the bolt ends. The preferred location for the bolt mechanism 14 is immediately behind the pull pin 16.

FIG. 5 shows further details of the power devices 19, 19', bolt mechanism 14 and instruments to obtain the desired locking action derived from the embodiment shown in FIG. 4. In this exemplary case, the power devices are pneumatic cylinders 19, 19' connected at their one shaft end to a lug, which has been fastened e.g. by welding to the protective casing 4 of the equipment. Pneumatic cylinders 19 and 19' receive a charging pressure from delivery pipe 56 connected to the filling pipe 55 of the trailer brake circuit and equipped with a return check valve 60 which prevents medium flow in a reverse direction. To pressurize the pneumatic cylinder 19, in order to drive the pull pin 16, the delivery piping 56 comprises a valve, for instance a magnetic valve, activated by the control system 10', 11' according to the invention. To pressurize the pneumatic cylinder 19', to drive the bolt mechanism 14, the delivery piping 56 also comprises a valve 65, for example a magnetic valve, activated by the control system 10', 11' according to the invention. The figure includes also the discharge piping of pneumatic cylinders 19 and 19' with discharge valves 62, 63 and 64. Valves 62 and 64 are electrically operated and the valve 63 is pressure-operated by the control pressure from the filling pipe 55. The valve 63 passes the medium flow to empty the cylinder 19, 19', when no pressure exists in the pipe 55.

The invention has been described above only by several of its preferred exemplary embodiments. This does not, of course, restrict the invention, but several combinations and modifications are possible within the scope of the appended claims. Particularly one must emphasize, that the invention is not necessarily connected with trucks and trailers, but that it can be also adapted to other vehicles, as buses and earthmovers. The security of the equipment according to the invention can still be increased by depositing for instance in the memory section of the control unit of the tractor vehicle a special service code, by which the condition of the locks in the motor space is controlled. Then the access to the motor space, into which the control unit 23 of the vehicle can most advantageously be placed, becomes possible only by the right code.

We claim:

1. A method of preventing theft of a tractor trailer combination or trailer alone, comprising:
providing a programmable first control system means on a tractor vehicle having a predetermined reference code stored therein and adapted to compare a subsequent reference code entered by a user and for generating a signal in response thereto;
providing a second control means on said trailer coupled to said first control system means for receiving the signal from the first control means and to generate a control signal in response thereto; and
providing a locking means on said trailer coupled to said second control system means to receive the control signal therefrom and in response thereto, in a first unlocked position rendering the trailer in a towable condition, and in a second locked position rendering the trailer in an untowable condition.

2. A method for preventing the theft of a tractor trailer combination or trailer alone, comprising:
providing a first control system means on a tractor vehicle and a second control system means on a trailer adapted to be towed by said tractor vehicle;
programming and storing in said first control means a first predetermined reference code, said first control means having a resident task stored in its memory for comparing a subsequent reference code entered by a user and for generating a coded signal in response thereto;
sending said coded signal from said first control means to said second control means;
receiving said coded signal at said second control means;
programming and storing in said second control means a second predetermined reference code, said second control means having a resident task stored in its memory for comparing said coded signal with the stored second predetermined reference code; and
generating and sending a first control signal from said second control means when said coded signal sent from the first control means matches the second predetermined reference code in the second control means and for generating and sending a second control signal when said coded signal fails to match said second predetermined reference code;
providing locking means coupled to said second control means for rendering said trailer towable when in a first unlocked position upon receipt of said first control signal and upon receipt of said second control signal said locking means moves to a second position locking said trailer to prevent the trailer from being towed by the tractor vehicle.

3. The method of claim 1 or 2 wherein the locking means includes means for locking and unlocking at least one of a turning shaft or a bogie on said trailer.

4. The method of claim 1 or 2 wherein the locking means includes means for selectively moving a pull pin on said trailer to a first, towable unlocked position and to a second, untowable locked position.

5. The method of claim 1 or 2 wherein the locking means includes a movable bolt means on said trailer adjacent a pull pin thereof for moving downwardly in a first locked position which prevents a tractor vehicle from coupling to said pull pin and for moving upwardly in a second unlocked position to permit coupling of said tractor vehicle to said pull pin.

6. The method of claim 1 or 2 including the step of providing an audio alarm means on said tractor vehicle coupled to said first control means and for activation when said subsequent reference code entered by a user fails to match the first stored reference code.

7. The method of claim 1 or 2 including the step of programming the first control means to receive a time delay reference code which permits said locking means to remain in said first unlocked position for a predetermined time period and upon expiration of said period causes said locking means to move to the second locked position.

8. The method of claim 1 or 2 wherein the trailer is a whole trailer and the locking means locks one of a trailer shaft, bogie or ball rings of a suspension bearing of said trailer.

9. The method of claim 1 or 2 wherein the trailer is a half-trailer.

10. The method of claim 1 or 2 wherein the predetermined reference code and subsequent user code are entered by a keyboard associated with said first control system means.

11. A method of preventing the theft of a trailer adapted to be towed by a tractor trailer, comprising:
providing a programmable control system means on said trailer having a predetermined reference code stored therein and adapted to compare a subsequent reference code entered by a user and for generating a control signal in response thereto, and
providing locking means on said trailer coupled to said control system means to receive the control signal therefrom and in response thereto in a first unlocked position rendering the trailer in a towable condition and in a second locked position rendering the trailer in an untowable condition.

12. The method of claim 11 wherein the locking means includes means for moving a pull pin on said trailer to a first, towable unlocked position and to a second untowable locked position.

13. The method of claim 11 wherein the locking means includes means for locking and unlocking at least one of a turning shaft or a bogie on said trailer.

14. The method of claim 11 wherein the trailer is one of a whole trailer, articulated trailer or half-trailer.

15. The method of claim 11 wherein said predetermined reference code and subsequent user code are entered by a keyboard associated with said control system means.

* * * * *